United States Patent [19]

Ely

[11] 4,368,007
[45] Jan. 11, 1983

[54] FLUID DRIVEN TURBINE

[76] Inventor: Walter K. Ely, 2445 Raymond Ave., Ramona, Calif. 92065

[21] Appl. No.: 196,130

[22] Filed: Oct. 10, 1980

[51] Int. Cl.³ ............................................. F03D 1/06
[52] U.S. Cl. .................................... 416/238; 416/121; 416/227 A
[58] Field of Search ..................... 416/11, 238, 176 A, 416/121 A

[56] References Cited

U.S. PATENT DOCUMENTS

| 464,607 | 12/1891 | Brown | 416/238 |
|---|---|---|---|
| 596,553 | 1/1898 | Sorensen | 416/196 A |
| 741,515 | 10/1903 | Lowe | 416/11 X |
| 893,052 | 7/1908 | Carlson | 416/176 A X |
| 970,404 | 9/1910 | Snee | 416/238 |
| 1,178,729 | 4/1916 | Kemble | 416/11 |
| 1,880,835 | 10/1932 | Crickmer | 416/245 B |
| 2,004,853 | 6/1935 | Crary | 415/2 A |
| 4,207,026 | 6/1980 | Kushto | 416/176 A X |

FOREIGN PATENT DOCUMENTS

| 77439 | 10/1894 | Austria | 415/2 A |
|---|---|---|---|
| 105536 | 2/1927 | Austria | 416/DIG. 6 |
| 672606 | 3/1939 | Fed. Rep. of Germany | 416/121 A |
| 744540 | 1/1944 | Fed. Rep. of Germany | 416/DIG. 6 |
| 830628 | 2/1952 | Fed. Rep. of Germany | 416/121 A |
| 836930 | 4/1952 | Fed. Rep. of Germany | 416/245 B |
| 855829 | 11/1952 | Fed. Rep. of Germany | 416/DIG. 6 |
| 547884 | 12/1922 | France | 416/176 A |
| 827487 | 4/1938 | France | 416/11 |
| 60805 | 8/1923 | Sweden | 416/121 A |
| 202310 | 4/1939 | Switzerland | 416/238 |
| 135568 | 11/1919 | United Kingdom | 416/11 |

*Primary Examiner*—Everette A. Powell, Jr.
*Attorney, Agent, or Firm*—Brown & Martin

[57] ABSTRACT

A fluid driven turbine includes a central rotor having a plurality of wind blades mounted circumferentially around the axis of the rotor and arranged to define a general spiral configuration extending along the axis of the rotor in a predominant fluid flow direction. The hub is spherically shaped to force the fluid outward with an increase in velocity into engagement with the blades.

5 Claims, 13 Drawing Figures

U.S. Patent  Jan. 11, 1983  Sheet 3 of 3  4,368,007
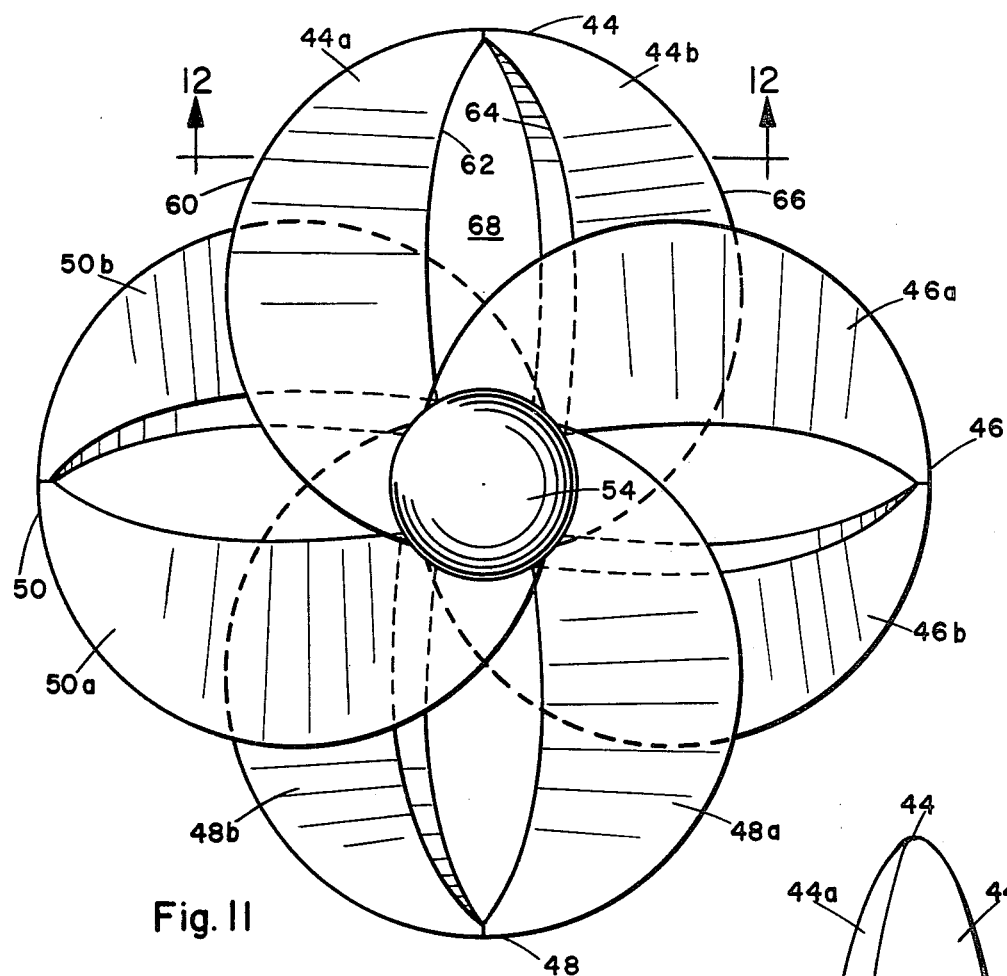
Fig. 11
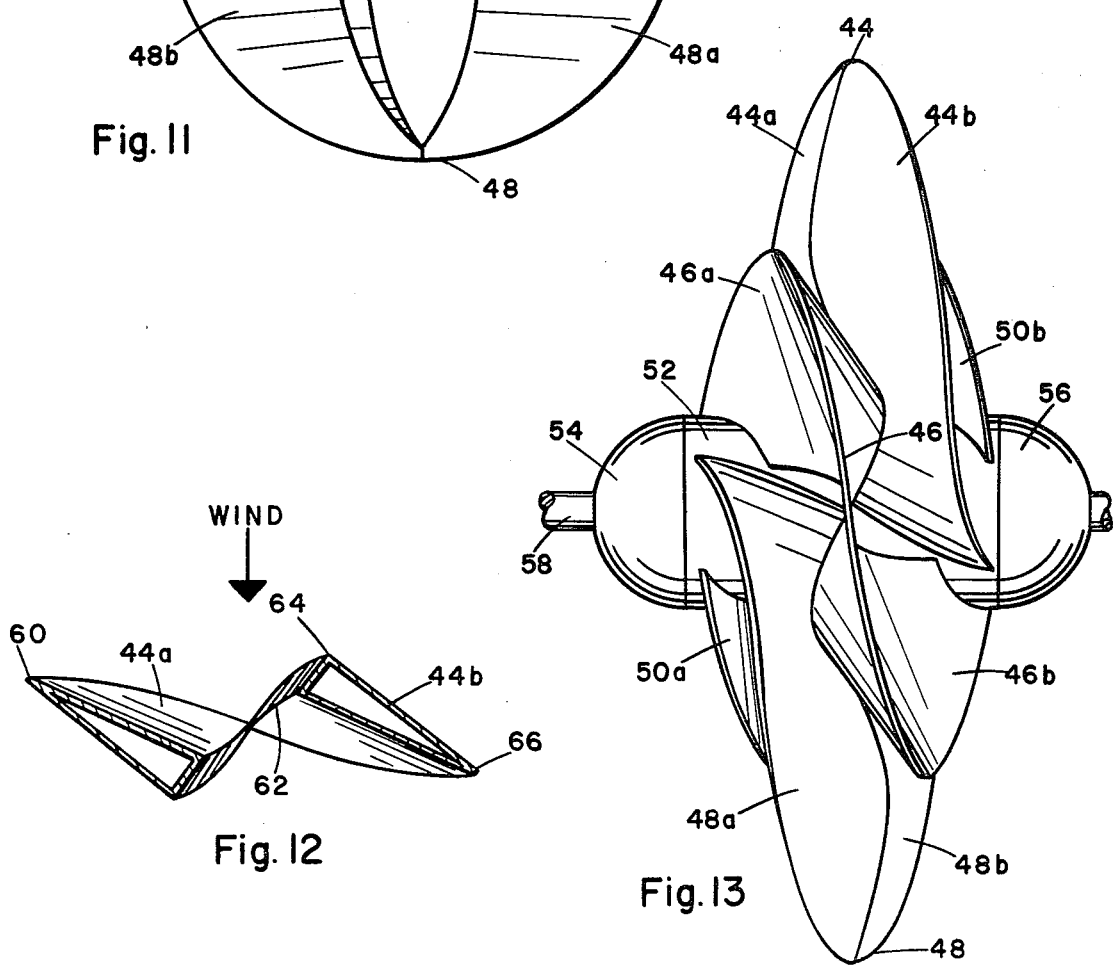
Fig. 12
Fig. 13

FLUID DRIVEN TURBINE

BACKGROUND OF THE INVENTION

The present invention relates to fluid rotors and pertains particularly to a rotor for wind and the like.

The recovery of energy from flowing fluids, such as water and air, has been a significant source of power for many centuries. Various designs of windmills and water wheels have been known for a considerable period of time. Water wheels have also been used for running mills and various other devices or plants requiring power. Hydraulic turbines are in use today in many regions for producing hydro-electric power. Such turbines convert the kinetic energy of a flowing water to electrical energy by rotating the turbines and the like.

Because of the decreasing supply of low cost energy in the form of fossil fuels and the like, a considerable amount of interest is again directed towards the extraction of energy from fluids such as wind and flowing water. Devices for such energy extraction is expected to become more important in the coming years.

Many different designs of wind and water turbines or rotors are known in the art. The various designs of the prior art each have their own advantages and disadvantages. Considering wind turbines for example, among the disadvantages of such wind devices include the inability to respond to the many different speeds or velocities of wind. Wind typically varies from time to time, from very low velocities to very high velocities.

Many of such designs are not suitable for high wind conditions. Many of the prior art designs use many different approaches to compensate for various wind conditions and for high wind conditions. Many of these result in a considerable loss of the energy from the wind.

Many prior art devices which are designed for high wind conditions utilize large thin long blades which operate at very high speeds and develop high forces. Such devices, however, are expensive to design and engineer and must be kept balanced in order to avoid destruction in high wind conditions.

Accordingly, it is desirable that high wind turbines be available which are responsive both to high winds and low winds and are not subject to the problems of the prior art.

SUMMARY AND OBJECTS OF THE INVENTION

It is accordingly the primary object of the present invention to overcome the above problems of the prior art.

Another object of the present invention is to provide an improved wind turbine that is effective in both high wind and low wind conditions and is simple and inexpensive to construct and maintain.

In accordance with the primary aspect of the present invention a wind turbine includes a rotor having a rotary axis that is designed to orient into a predominantly wind direction and includes wind sails or blades that curve along the axis into the wind and are designed to function in conjunction with a central rotor body portion for compressing high velocity wind and direct it to a working portion of the blade.

BRIEF DESCRITION OF THE DRAWINGS

The above and other objects and advantages of the present invention will become apparent from the following description when read in conjunction with the drawing wherein:

FIG. 11 is a front view of a still further form of the fluid turbine.

FIG. 12 is a sectional view on line 12—12 of FIG. 11.

FIG. 13 is a side elevation view of the structure of FIG. 11.

DETAILED DESCRIPTION OF PREFERRED EMBODIMENTS

Figure 1:
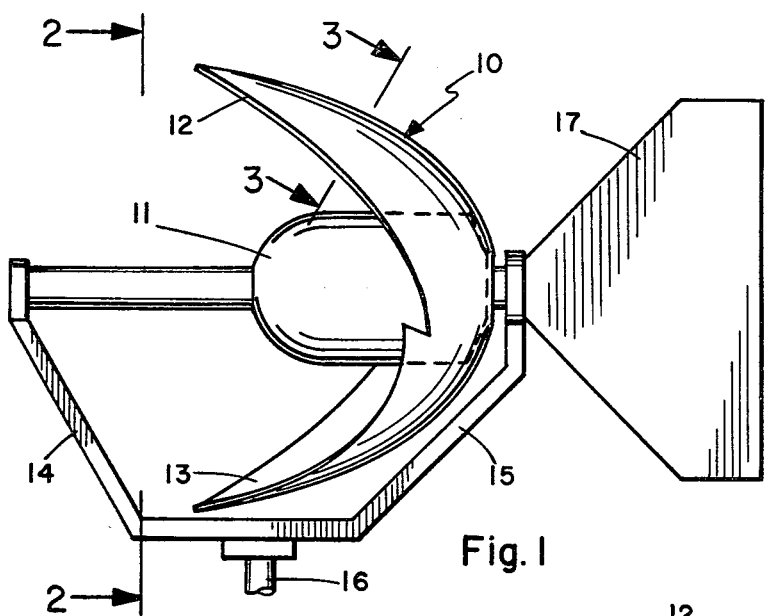
FIG. 1 is a side elevation view of a two bladed form of the fluid turbine.
Figure 2:
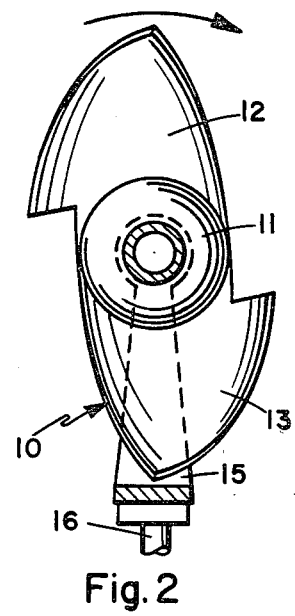
FIG. 2 is a sectional view taken on line 2—2 of FIG. 1.
Figure 3:
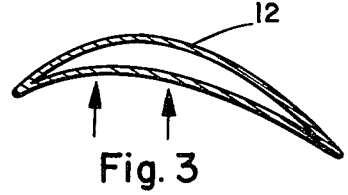
FIG. 3 is an enlarged sectional view taken on line 3—3 of FIG. 1.

Turning to FIGS. 1-3 of the drawings a first embodiment illustrates the principles of the invention. A fluid turbine or windmill designated generally by the numeral 10 includes a central rotor 11 having a pair of outward extending, forwardly curved sails or blades 12 and 13 extending outward and forwardly along the axis of the central rotor portion 11. The sails curve and arch forward along what is the axis of the rotor which is designated for the predominant wind direction. Thus, the blades are designed and mounted to curve into the wind. The rotor is mounted in a support assembly for rotation about its central axis with the support assembly including a bracket having a pair of upward extending arms 14 and 15 for supporting the rotor. The support is mounted for rotation in a horizontal plane about a vertical axis or shaft 16. A wind vane 17 may be provided for orienting the turbine into the predominant wind direction. A further characteristic feature is the fact that the blade and turbine design is such that it can be, with proper mounting, self orienting without the need of a vane. This simply requires the mounting of the blade aft of the vertical axis with the rotor responding to the wind force for orienting the rotor.

A significant feature in accordance with the theory of the invention, the central rotor 11 is formed in a somewhat bulbulous nose shape which defines what I term a compression hub. This acts in conjunction with the forwardly curving sails or blades to compress air flowing along the axis outward along the hub and inward along the inside surface of the blades 12 and 13. The increasing velocity of the air flow forces it radially outward to the tips with some bleeding smoothely off the trailing edge of the blade as shown in FIG. 3 forcing the air flow as shown by the arrows causing higher speed rotation of the turbine blades. The arcuate or semi-cup shape of the blades enhance their structural strength and stability as well as contribute to the compressive effect of the moving air. The blades define by their outer surface a substantially parabolic configuration when viewed in side elevation as seen in FIG. 1.

Figure 4:
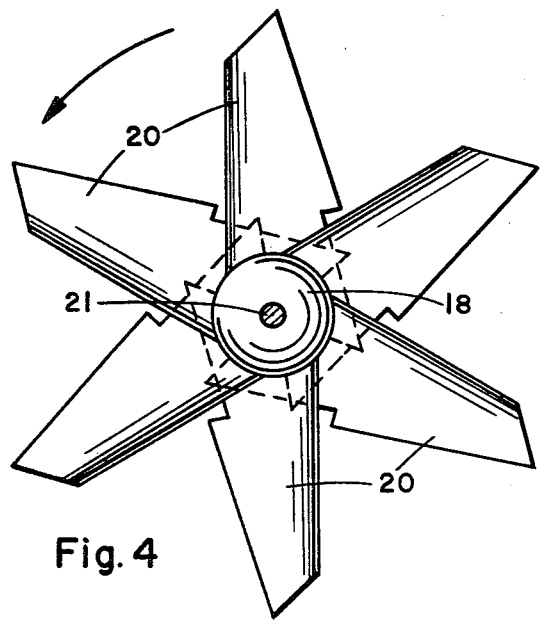
FIG. 4 is a front view of a six-bladed form of the fluid turbine.
Figure 5:
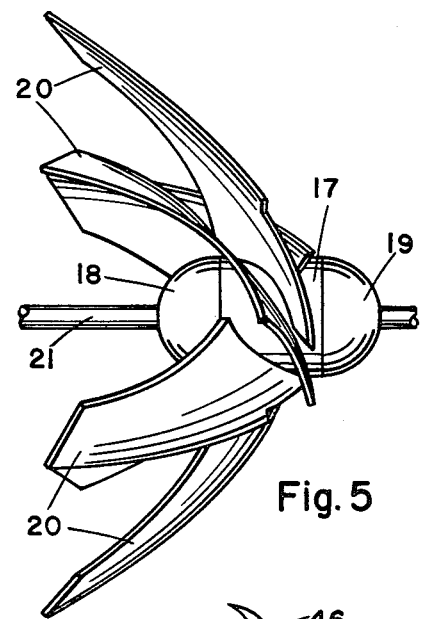
FIG. 5 is a side elevation view of the structure of FIG. 4.

Turning now to FIGS. 4–5 of the drawings there is illustrated an alternate embodiment having a plurality of blades of a slightly different configuration yet curving into the wind in cooperation with a compressive hub.

The rotor in FIG. 4 includes a central cylindrical hub portion 17 with a forward semispherical nose portion 18 and a rear semispherical portion 19. The plurality of blades of identical construction and configuration 20 are secured to the central hub portion 17 and extend outward curving forward around the axis of the shaft 21 in the predominant wind direction. The blades curve into the wind and, as explained in the previous embodiment, function in conjunction with the nose portion 18 as a compressive structure forcing the wind flowing therealong into the scoop-like blades producing a high density, high velocity stream outward to the blade tips and the trailing edges of the blades. Other shapes of the compressive nose portion 18 can be utilized such as conical shape, for example, or other outwardly curved surfaces from the central axis outward into the front or face of the turbine blades. The outer surface of these blades as seen in FIG. 5, also have a parabolic configuration. The blades are preferably constructed to taper from a thick base, outwardly to a thin tip. This gradually enhances the pitch and strength of the blades.

Figure 6:
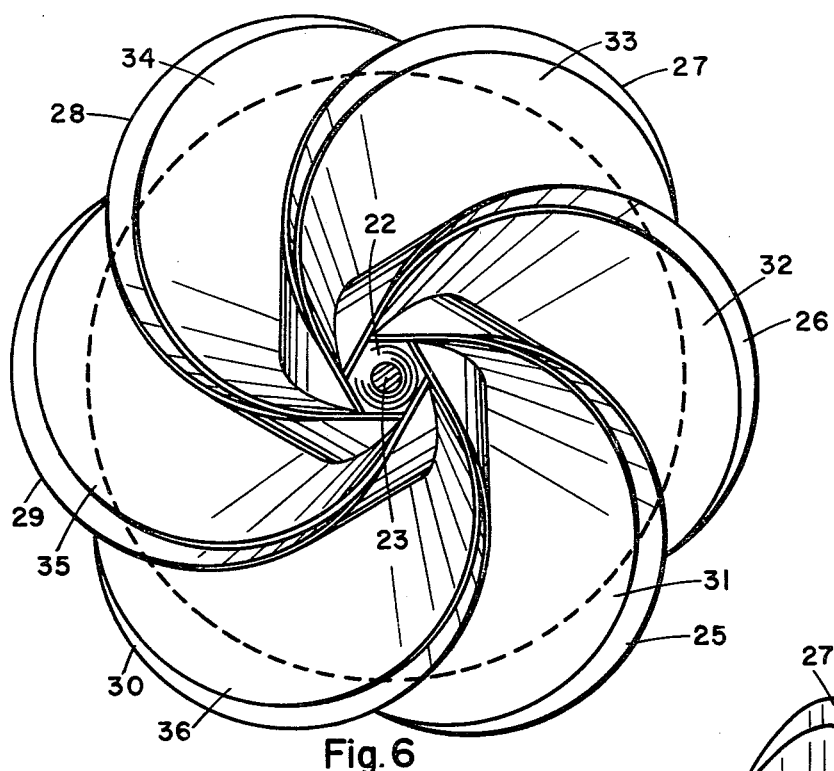
FIG. 6 is a front view of a multi-bladed fluid turbine.

Turning now to FIG. 6, a further embodiment of the invention includes a rotor having a central rotor or hub portion 22 mounted for rotation about an axis of a shaft 23 and includes a plurality of spiral multiple effect blades. The blades interlock and cooperatively engage to spiral outward from the central axis and are connected at the trailing edge to a radially extending disk member 24 which is rotated with and mounted co-axially of the shaft 23. The cooperation between the respective blades spirals radially outward from an inner diameter substantially the same as the center rotor portion 22 outward to substantially the diameter of the disk 26. Thus, wind forced face on into the rotor is forced radially outward between the blades as it flows there along compressing the air therein resulting in an increased velocity of the air and rotor.

Figure 7:
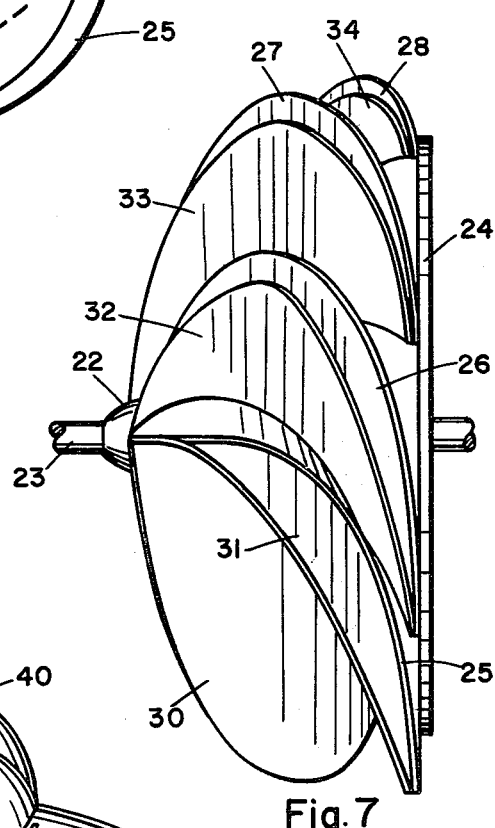
FIG. 7 is a side elevation view of the structure of FIG. 6.

The construction as shown in FIGS. 6 and 7 comprises a turbine having a plurality of spiraled directed primary blades 25, 26, 27, 28, 29, and 30. Each of the primary blades respectively have an inner secondary blade 31, 32, 33, 34, 35, and 36 respectively. These secondary blades are mounted directly on the face of the primary blades and in a spiral fashion and have an increased angle at the face thereof forming a channel between the primary and secondary blades of each turbine blade assembly. In addition to the channel between respective turbine blades a secondary channel is formed between each primary and secondary blade of each blade assembly. This spiraling configuration of the blades provides a compressive effect on the wind impending or directed thereon.

Figure 8:
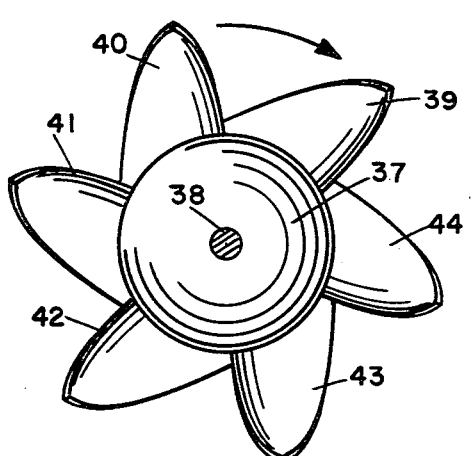
FIG. 8 is a front view of a further form of the fluid turbine.
Figure 9:
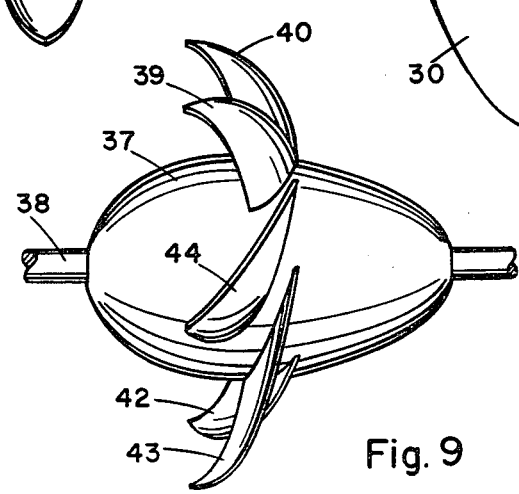
FIG. 9 is a side elevation view of FIG. 8.

Turning now to the FIG. 8 embodiment, there is illustrated a turbine rotor having an enlarged central hub portion 37 mounted for rotation about a central axis of a shaft 38. The central rotor portion is enlarged as compared to the total diameter of the rotor as represented by plurality of the turbine blades. A plurality of turbine blades 39, 40, 41, 42, 43, and 44 are secured to the central portion of the hub and extend radially outward and axially forward along the axis of the shaft 38 with the tip pointing substantially parallel to the axis. The blades as in the previous embodiment extend toward the predominant wind direction, that is, into the wind. As will be apparent from the illustration the central hub portion or the compressive hub portion 37 has a radius that is essentially one half, as illustrated, of the radius of the entire rotor. This provides a fairly high speed rotor with a considerable amount of the air flowing along the face of the compressive rotor face to the turbine blades. The previously described embodiments can incorporate this feature and can accordingly be similarly constructed to have a similar geometric arrangement.

Among the advantages of the present invention is the fact that large diameter blades are not required for extracting a high amount of energy from a given wind condition or velocity. For this reason, other advantages of the present invention include the fact that the smaller diameter turbines can be mounted in clusters and connected together such as illustrated in FIG. 10.

Figure 10:
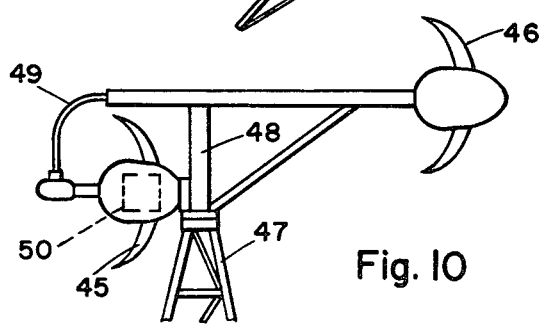
FIG. 10 is a side elevation view schematically illustrating a multi-turbine assembly.

Turning to FIG. 10 of the drawings there is schematically illustrated a cluster of turbines which includes a first turbine 45 and a second turbine 46 mounted on support structure atop a tower 47. Support structure for the turbines include a vertical strut 48 mounted for rotation about a vertical axis on top of a tower for supporting the turbine 45 and 46 for orientation into the predominant direction of the wind. As further illustrated in the embodiment the turbines are mounted and connected together by means of a drive shaft 49 such that the power from the turbines can be combined and utilized for driving one or more generators 50 which can be mounted inside the rotor 45. This is simply for illustrative purposes, and it is to be understood that a generator may be mounted in both units in which case the inerconnection by drive shaft is unnecessary. In addition any of the embodiments heretofore illustrated and described and any equivalence thereof can be utilized with a generator built into the central hub thereof.

In addition to the above features the embodiment as illustrated in FIG. 10 is such as to be essentially self directing into the wind. The trailing turbine 46 forces the entire assembly to orient into the prevailing wind direction and the forward turbine 45 is mounted to substantially counter balance the force or weight of the turbine 46. With this arrangement in addition the forward turbine is mounted below the axis of the trailing turbine 46 and thus wind shadow effect is reduced or eliminated. It should be appreciated that numerous turbines of this type can be mounted on an assembly both above, below, or to either side of turbines and arranged to cover a substantial area of wind without interferencing between the various turbines.

Turning to FIG. 11 of the drawing there is illustrated a slotted blade version of the invention wherein a plurality of blades 44, 46, 48 and 50 are mounted on a central hub member 52 that has a generally cylindrical configuration and a forward semi-spherical nose 54. This hub is mounted on a shaft 58 for driving the shaft or other means thereon. Each of the blades are identical and each consist of a double identical blade member turned in the reverse direction.

In understanding or describing the specific blades for example, blade 44 includes a forward blade portion 44a and a rear blade portion 44b. Similarly, the blade 46 includes a forward blade portion 46a and a rear blade portion 46b. The blade 48 includes a forward blade portion 48a and a rear blade portion 48b. Blade 50 includes a forward blade portion 50a and a rear blade portion 50b. This arrangement and construction will be best seen and understood for example in viewing alternately between FIGS. 11, 12 and 13. As will be appreciated when viewing FIG. 11, each of the blades is circular in front configuration and each of the portions of the blades, as can be seen from FIG. 13, are identical but reversed to extend or project in an opposite direction along the axis of the rotor. The half-blades are identical but reversed in direction on the shaft or rotor cylinder body 52 such that the rotor is essentially symmetrical about a plane through the center of the rotor as seen in FIG. 13.

This embodiment of the turbine can be mounted in channels of fluid flow in alternate directions along a fixed axis. For descriptive purposes herein one direction of wind or fluid is considered. The blades each include a scalloped face on the upwind side and the aft or rearward blade portion includes a similarly shaped scalloped portion of the trailing side or downwind side of the blade. The upwind side of the blade includes a sloping surface sloping from the slot between the blades downward into the semi-circular trailing edge of the blade.

The blade 44 will be more fully described as seen in FIG. 12 with wind direction along the arrow. The blade 44a includes a leading edge 60 with a face sloping back to a trailing edge 62. The blade 44b includes a leading edge 64 with a face sloping back to a trailing edge 66. An oval slot 66 is formed between edges 62 and 64. These blades (half-blades 44a, 44b) are three dimensioned with each being somewhat wedge shape in cross section. It will also be noted that (FIG. 13) each blade curves or bows along the axis of rotation thereof. As will be seen in FIG. 12, the blades are three dimensional in structure.

This embodiment of the invention, (FIGS. 11-13) is designed to mount between two towers in the path of alternate prevailing fluid or wind such as to and from the sea. These turbines can be mounted in canyons leading to the sea or ocean and in canyons leading to deserts. They can also be mounted in harbor and river channels near the sea to take advantage of tide flows to and from the ocean. This eliminates the need for expensive mounting for rotation about a vertical axis for orienting into the wind.

This embodiment also utilizes the displacement principle of displacing the fluid outwardly from a semi-spherical nose into the blades at an increased velocity. The nose or hub in the several embodiments of the invention is preferably in the form of a prolate spheroid.

While I have illustrated and described my invention by means of several embodiments, it is to be understood that numerous changes and modifications may be made therein without departing from the spirit and scope of the invention as defined in the appended claims.

Also, while the invention has been discussed primarily in relation to wind, it is to be understood that I do not wish to be limited to any particular fluid.

Having described my invention, I now claim:
1. A fluid turbine rotor comprising:
   a central hub having a generally spheroid configuration mounted for rotation about an axis;
   a plurality of forwardly curved self supporting wind blades having a base and an outer tip and mounted at said base on said hub,
   said wind blades each having a relatively wide base tapering down substantially to a point at the outer tip, each blade curving and extending forwardly along said axis with increase in radius from said base to said point at said outer tip with said tip positioned forward of said base with said tip pointing substantially parallel to said axis.
2. The fluid turbine of claim 1 wherein said rotor has a prolate spheroid configuration and said blades are secured to one end of the rotor and projected radially outward and axially forward at the outer tips.
3. The fluid turbine of claim 2 wherein said hub has a nose portion that extends outward from the rotary axis to at least one-half the radius of the rotor.
4. The fluid rotor of claim 2 wherein said blades are curved forward along said axis terminating at the outer end in said forwardly projecting tips extending beyond the forward end of said hub.
5. The fluid turbine of claim 2 wherein the blades of said rotor have an outer surface that defines a substantially parabolic configuration in side elevation.

* * * * *